United States Patent [19]

Oberbeck et al.

[11] 4,152,637

[45] May 1, 1979

[54] SATURABLE REACTOR LIMITER FOR CURRENT

[75] Inventors: George A. Oberbeck, Belmont; William E. Stanton, Newton; Andrew W. Stewart, Weymouth, all of Mass.

[73] Assignee: The Charles Stark Draper Laboratory, Inc., Cambridge, Mass.

[21] Appl. No.: 808,067

[22] Filed: Jun. 20, 1977

[51] Int. Cl.² .......................... G05F 1/22; G05F 1/00
[52] U.S. Cl. ......................................... 323/6; 323/9; 323/56
[58] Field of Search ....................... 323/6, 9, 89 P, 56, 323/92; 361/35, 87, 93, 112, 118

[56] References Cited

U.S. PATENT DOCUMENTS

| | | | |
|---|---|---|---|
| 2,312,416 | 3/1943 | Johnson | 323/6 |
| 2,727,202 | 12/1955 | Lanfers et al. | 323/89 P |
| 3,177,402 | 4/1965 | Muchnick et al. | 323/89 P |
| 4,031,457 | 6/1977 | Oberbeck | 323/9 |

Primary Examiner—Gerald Goldberg
Attorney, Agent, or Firm—Kenway & Jenney

[57] ABSTRACT

A saturable reactor device for limiting alternating and direct current in an external electric circuit. In one form, the required magneto-motive force (mmf) bias for the saturable reactor is provided by a controllable flux bias element in order to minimize the required bias power. A current sensor provides a control signal representative of the alternating or direct current passing between the source and the load. This signal is used to control the magnitude of the bias so that the mmf provided by the bias element is a function of the current driving the load, permitting a current limiting threshold at a predetermined percentage of the current applied to the load. In an alternate form, the device may be adapted to limit bipolar current in the external circuit. In this form, the device includes an input circuit and an associated direct current saturable reactor limiter. In response to direct current of either positive or negative polarity passing through the external circuit, unidirectional current is driven through the input coil of the direct current limiter. The magnitude of the unidirectional current passing through the input coil is proportional to the magnitude of the current provided by the source. When the unidirectional current exceeds a predetermined threshold, the direct current limiter effectively provides a relatively high current-limiting impedance between the source and load of the external electric circuit. When the unidirectional current is below that threshold, the direct current limiter has minimal effect on the external electric circuit.

20 Claims, 4 Drawing Figures

SATURABLE REACTOR LIMITER FOR CURRENT

REFERENCE TO RELATED APPLICATIONS

This application is related to U.S. patent application Ser. No. 635,895 now U.S. Pat. No. 4,031,457, filed Nov. 28, 1975, which is a continuation-in-part of U.S. patent application Ser. No. 614,773, filed Sept. 19, 1975, now abandoned. Application Ser. No. 635,895 is incorporated by reference to the present application. The present application is assigned to the same assignee as Ser. No. 635,895.

FIELD OF THE INVENTION

The present invention relates to current limiting devices, and in particular, to magnetically biased saturable reactor current limiters.

BACKGROUND OF THE INVENTION

There is a need to protect electric circuit elements from excessive current transients caused by load impedance changes or power supply surges. The prior art thermal fuse or electromagnetic circuit breaker opens the circuit at a predetermined current or current-time product. Such devices are slow acting and often do not respond to fast acting transients. Further, such devices typically must be manually reset or replaced after tripping. Other prior art approaches to limiting current have led to complex and often weighty circuit elements.

The incorporated reference in part teaches a magnetically biased saturable reactor transient current limiter that is fast acting, compact and which automatically resets upon return to a normal current level.

In all of the configurations disclosed by the incorporated reference, a biasing element is utilized to establish a predetermined constant magneto-motive force. As a result, such current limiters must always be operated with a sufficient bias level to accommodate any expected change in current through the electric circuit. As a result, relatively high energy is required to maintain this bias state to accommodate turn-on transients in high usage period operation as well as time periods when usage and transients are expected to be relatively low. In addition, certain direct current limiting embodiments described in the incorporated reference, such as that described in conjunction with FIG. 1 of that reference, are suitable for limiting current transients of one polarity. While such embodiments are effective with regard to such transients, it is often desirable to provide current limiting with respect to transients of either positive or negative polarity. Certain of the alternating current limiter embodiments of the incorporated reference, notably, those described in conjunction with FIGS. 10-13 of that reference, are suitable for use as limiting devices for such transients to a limited extent. However, in each of those configurations, a pair of magnetic material core elements are used with appropriately directed input coils to provide coupling to the electric circuit in which current is to be limited. The requirement for two such input core elements places substantial limits upon the size and cost and complexity of the configurations of the current limiters disclosed in the incorporated reference. Furthermore, these configurations are characterized by relatively large bias power requirements in order to maintain the appropriate flux bias in the input core elements.

It is an object of the present invention to provide a saturable reactor current limiting device which utilizes a relatively low level of bias energy.

It is another object to provide a saturable reactor bipolar current limiter device utilizing a relatively small amount of magnetic core material and associated windings.

SUMMARY OF THE INVENTION

In accordance with the present invention, saturable reactor current limiters may be adapted to minimize the required bias energy in direct current and alternating current embodiments. The magneto-motive force (mmf) is provided by a controllable bias element, such as a coil wound around permeable material or, alternatively, an air-core winding, with the coil driven by a controllable current source. In this configuration, a current sensor may provide a control signal representative of the alternating or direct current passing between the source and the load, with this signal controlling the magnitude of the current passing through the bias coil of the current limiter. As a result, the bias current, and thus the mmf provided by the bias element, is a function of the current driving the load. Accordingly, the current limiter of this invention may be adapted to provide a current limiting threshold at a predetermined percentage of the current applied to the load, rather than some fixed value which must be selected to be high enough to accommodate start-up and short term transients which may occur.

Alternatively, the current source for the bias coil may be programmed for operation so that during periods of differing expected usage, different current limiting thresholds are established, with the lower thresholds requiring less bias energy than the higher thresholds.

In accordance with a further aspect of the present invention, a diode bridge circuit may be interconnected in series with a power supply and the load. A direct current limiter, of the form disclosed in the incorporated reference, is coupled across the rectifying terminals of the bridge circuit. In this configuration, direct current of either positive or negative polarity may be transferred from the source to the load, while unidirectional current is passed through the input coil of the direct limiter. The magnitude of the unidirectional current passing through the input coil is proportional to the magnitude of the current provided by the source. When the unidirectional current exceeds a predetermined threshold, the direct current limiter effectively provides a relatively high current-limiting impedance between the source and load of the external electric circuit. When the unidirectional current is below that threshold, the direct current limiter has minimal effect on the external electric current.

With this configuration, current transients of either positive or negative polarity may be limited, in contrast to the saturable reactor direct current limiter disclosed in the incorporated reference which only limits current transients of a single polarity. This latter aspect of the present invention may also be utilized in conjunction with the bias power control aspect described above.

BRIEF DESCRIPTION OF THE DRAWINGS

The foregoing and other objects of the invention, the various features thereof, as well as the invention itself, may be more fully understood from the following description, when read together with the accompanying drawings, in which.

DESCRIPTION OF THE PREFERRED EMBODIMENT

Figure 1:
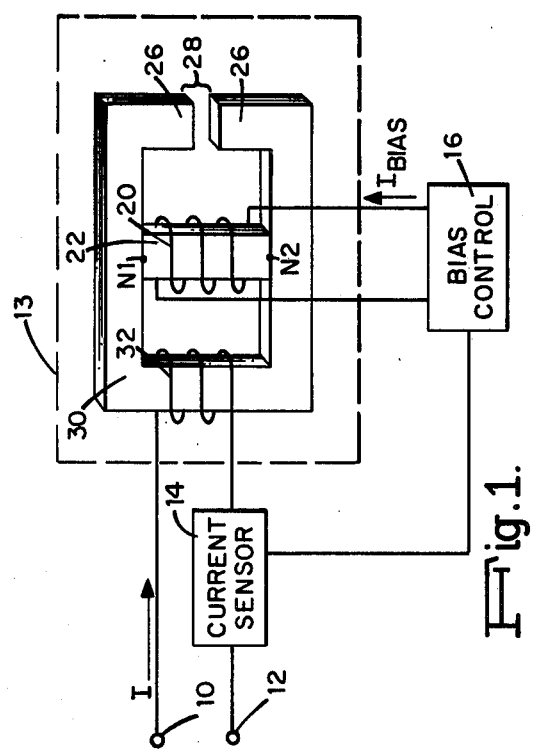
FIG. 1 shows, in schematic form, a low bias power saturable reactor limiter for direct current.

A controlled bias device suitable for limiting direct current through an external electric circuit branch is shown in FIG. 1. This embodiment includes a pair of terminals 10 and 12 for coupling the device in series with the external circuit branch. In alternative embodiments, different coupling techniques may be used, e.g., in d.c. embodiments, a Hall-effect device may be used. The FIG. 1 configuration includes a direct current limiter 13, a current sensor 14 and a bias control 16.

The direct current limiter 13 is substantially similar to the direct current limiter described in conjunction with FIG. 1 of the incorporated reference, except that the permanent magnet bias leg of the incorporated reference system has been replaced by a coil 20 wound around a permeable magnetic core element 22 and coupled to a controlled current source in bias control 16 which establishes a bias current, $I_{BIAS}$, in coil 20.

The direct current limiter 13 comprises a magnetic circuit having three branch elements (or legs) extending between two nodes denoted $N_1$ and $N_2$. The first leg 26 is composed of a saturable material and is configured with an air gap 28. The second leg 30 is also composed of a saturable material and is wound with a coil 32 which is electrically connected across terminals 10 and 12. In the useful range of the embodiment, the first leg 26 is characterized by a permeance which is relatively high compared to the medium external to the device, but less than the permeance associated with the second leg 30 in its non-saturated state. The third, or bias, leg 40 comprises the core element 22, together with the coil 20 and associated current sources of control 16. The winding direction of the coil 32 is such that current I through the coil 32 produces flux in the second leg 30 in opposition to the flux coupled therein from the bias leg 22.

The current sensor 14 is coupled to the external electric circuit and provides a control signal representative of the magnitude of the current I passing through the coil 32. The bias control 16 is coupled to sensor 14 in a manner responsive to the control signal produced by the sensor 14 to produce the bias current $I_{BIAS}$ through the coil 20. The sensor 14 may be any current sensing device known in the art suitable for detecting levels of current in a line. By way of example, sensor 14 may include a Hall-effect device.

In general, with this configuration at relatively low current levels in coil 32, the mmf produced by the $I_{BIAS}$ current in the coil 20 overcomes that produced by the current I in coil 32. As a result, the net flux in the second leg 30 is sufficient to drive that leg into saturation and thereby maintain a low inductance circuit across terminals 10 and 12 to establish a relatively low impedance in series with the load of the electric circuit. The bias leg 22 also establishes a relatively low level of flux in the first leg 26. A high transient current in the external electric circuit passes through the coil 32. This current flow generates a high magneto-motive force (mmf), tending to offset the $I_{BIAS}$-induced mmf in the second leg 30, and thereby reducing the net flux density in that leg. The reduction in flux in the second leg 30 is accompanied by a related increase in flux in the first leg 26, and by a relatively small flux change in the bias leg 22. Flux change in leg 22 may be minimized by a shorted turn, a parallel capacitor or other similar means.

As the second leg 30 is driven out of saturation, its permeance is sharply increased. As a result, the inductive impedance provided by the coil to the external circuit is greatly increased during transient current conditions. When the current through the coil 32 returns to a relatively low level, the above process reverses and the second leg 30 returns to its saturated state. It will be understood that all embodiments may only limit current transients in a predetermined voltage-time characteristic range in order to prevent the driving of leg 30 beyond its high permeance region and into reverse saturation.

By appropriately adjusting the response of the bias control 16 to linearly relate I with $I_{BIAS}$ by a scale factor, the operation of the FIG. 1 device may be adapted to limit current in the electric circuit when a transient current at terminal 10 exceeds a predetermined percentage of a nominal current level, rather than when a transient exceeds an absolute threshold value, thereby attaining a substantial bias power saving. In other embodiments, different scale factors for the I-$I_{BIAS}$ relationship may be programmed for various time periods.

Figure 2:
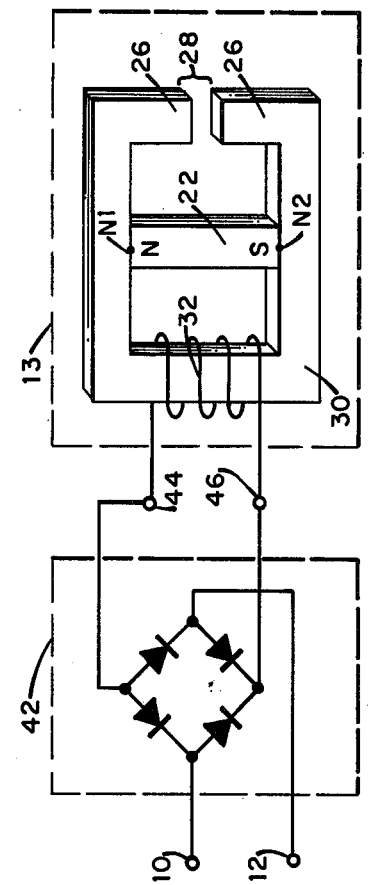
FIG. 2 illustrates the operation of the limiter of FIG. 1.

In an alternative mode of configuration, the bias control may be programmed to provide a relatively high level $I_{BIAS}$ (requiring a correspondingly high level bias power input) at times when the load current I through the electric circuit branch is expected to be relatively high. However, at times when the load current I is expected to be relatively low, a relatively low level $I_{BIAS}$ is provided. This mode of operation is illustrated in FIG. 2 which shows the magnetic flux-magnetomotive force (mmf) characteristic relationship of an exemplary leg 30. The points $O_1$ and $O_2$ represent the nominal bias points for leg 30 during two first and second periods of operation. These points are established by bias currents in coil 20 of $I_1$ and $I_2$, respectively. During normal operation, the operating points on the characteristic relationship of FIG. 2 are to the left of the points $O_1$ and $O_2$ by an amount proportional to the "normal" current I through the coil 32. During the first period, the normal current and a current transient must produce a change in mmf equal to $\Delta_1$ before leg 30 is driven out of saturation and current limiting occurs (due to substantially increased permeance). During the second period a change in mmf equal to $\Delta_2$ is required.

With the present invention, in both high and low load current conditions, current limiting may be provided for sudden current changes, while requiring bias power which varies with the actual or expected load current. In contrast, the previously developed saturable reactor current limiters utilize a constant bias power level which is sufficiently high to limit transients at a high current level.

Figure 3:
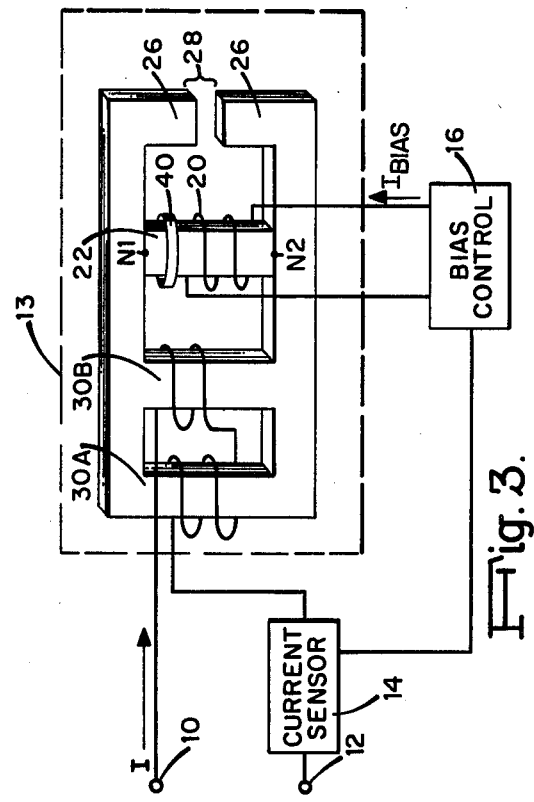
FIG. 3 shows, in schematic form, a low bias power saturable reactor limiter for alternating current.

FIG. 3 shows an alternative configuration of the present invention which is suitable for use in limiting alternating current. Elements in FIG. 3 which correspond to similar elements in FIG. 1 are identified with the same reference designations. The FIG. 3 configuration is similar to the device described in conjunction with FIG. 10 of the incorporated reference, except that the permanent magnet bias leg of the incorporated reference system has been replaced by a coil 20 wound around a permeable magnetic core element 22 and coupled to a controlled current source in bias control 16. The control 16 establishes a bias current $I_{BIAS}$ in coil 20 in the same manner as described above in conjunction with FIG. 1, to provide controlled bias power operation for an alternating current limiter. By way of example, the current sensor 14 may include a current transformer having an input winding coupled in series between terminals 10 and 12, and an output winding coupled to bias control 16. The bias coil 20 may be coupled across the rectifying terminals of a line-powered silicon controlled rectifier (SCR) bridge in bias control 16, wherein the average line current detected by the transformer controls the turn-on delay of the SCR's in the bridge. In this form, a smoothing capacitor may be connected across the coil 20. In the FIG. 3 embodiment, the second magnetic circuit branch element includes sub-elements 30A and 30B with the coil 32 having oppositely wound sections 32A and 32B around the respective sub-elements 30A and 30B. In addition, a conductive shorting bar 40 is circuitously disposed about the bias leg 22. During each half cycle of operation, either sub-element 30A or 30B is operative so that the FIG. 3 configuration operates substantially as disclosed above in conjunction with FIG. 1 to limit current transients passing through the coil 32.

Figure 4:
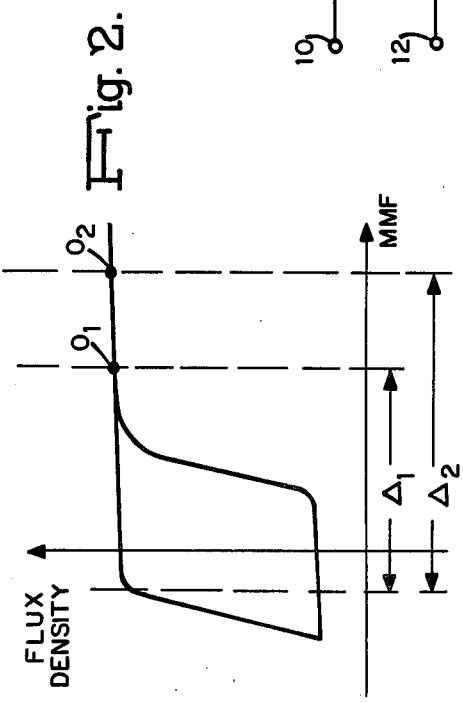
FIG. 4 shows, in schematic form, a saturable reactor limiter for bipolar current transients.

Another embodiment of the present invention suitable for limiting bipolar current transients is shown in schematic form in FIG. 4. In that figure, elements having corresponding elements in FIG. 1 are identified with the same reference designations. The FIG. 4 embodiment includes an input circuit 42 and an associated direct current limiter 13. The limiter 13 is shown with a permanent magnet bias leg 22 providing fixed flux bias. In alternative embodiments, leg 22 may be an air core coil, or a permeable magnetic core element having a bias coil would thereabout, which is coupled to a current source, either fixed, or controlled in the manner described above in conjunction with FIG. 1.

As illustrated, input circuit 42 comprises a diode bridge. In alternative embodiments, differing circuits may be used. The input circuit 42 includes an input terminal coupled to terminals 10 and a non-rectifying output terminal coupled to terminal 12. These terminals may be directly coupled in series with the electric circuit branch in which current transients are to be limited. Alternatively, other coupling means, such as a transformer, may be utilized in order that the current between terminals 10 and 12 is proportional to the current in the external electric circuit branch. The input circuit 42 further includes a pair of output terminals 44 and 46 which provide unidirectional current through a load connected across those terminals, wherein the magnitude of the unidirectional current is proportional to the magnitude of the current applied through terminals 10 and 12. With this configuration, a current transient of either positive or negative polarity causes a unidirectional current to flow through a load across the terminals 44 and 46.

The illustrated direct current limiter 13 is substantially similar to the direct current limiter described in conjunction with FIG. 1 of the incorporated reference. Alternative forms in the incorporated reference are also suitable for use with the present invention.

With this configuration, a high transient current of either positive or negative polarity in the electric circuit produces a high transient unidirectional current in the coil 32. If the resultant mmf in leg 30 is sufficient to offset the bias mmf in that leg (as established by bias leg 22), then the second leg 30 is driven out of saturation and its permeance is sharply increased. As a result, the inductive impedance provided by the coil to the external circuit is greatly increased during transient current conditions. When the unidirectional current through the coil 32 returns to a relatively low level (as a result of low current passing through the external circuit by way of terminals 10 and 12), the above process reverses and the second leg 30 returns to a permanent magnet induced saturated state.

In order to reduce bias power requirements, the FIG. 4 configuration may be arranged in a manner similar to the embodiments described above in conjunction with FIGS. 1 and 3, i.e., with the leg 22 comprising a coil and associated bias control and sensor corresponding to the elements 20, 16 and 14, respectively, in those figures.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A device for limiting current in an electric circuit branch comprising:

A. at least three magnetic circuit branch elements extending between two nodes:
      i. the first of said branch elements being characterized by a permeance $P_1$,
      ii. the second of said branch elements being characterized by a non-linear permeance $P_2$ and having saturated and non-saturated states, wherein $P_2$ is greater when said second element is in said non-saturated state than when in said saturated state, and wherein the magnetic flux density of said second element is equal to a saturation flux density which is relatively invariant with respect to magneto-motive force applied across said second element when in said saturated state, and said magnetic flux density is less than said saturated flux density otherwise,
      iii. the third of said branch elements is characterized by a permeance $P_3$ and includes a magneto-motive force (mmf) bias means for establishing a bias magnetic flux density in said third element, and includes means for sensing the level of said current and for generating a control signal representative thereof, and wherein said mmf bias means is responsive to said control signal to establish said bias mmf on said third element, the magnitude of said established mmf being a predetermined function of the level of said current, and B. an input coil including means for electrically coupling said device to said electric circuit branch so that said current passes therethrough, said coil having a plurality of windings extending about said second element so that mmf is induced on said second element is response to said current, wherein said elements are magnetically coupled to said nodes, and $P_1$ is relatively high with respect to the medium external to said device, $P_2$ is greater than $P_1$ and is relatively high with respect to the medium external to said device when said second element is non-saturated, and $P_3$ is relatively low with respect to $P_1$ and $P_2$ when said second element is non-saturated, and wherein further the net magnetic flux density in said second element is equal to the saturation flux density for said second element when said current is below a predetermined threshold, and said net flux density is below said saturation flux density when said current is in a predetermined range above and extending from said threshold.

2. The device according to claim 1 wherein said predetermined function defines a linear relationship.

3. The device according to claim 1 wherein said third element comprises a coil driven by a current source, said current source being responsive to said control signal.

4. The device according to claim 3 wherein the coil of said third element is wound around a relatively high permeance core.

5. The device according to claim 4 further including a shorting bar disposed circuitously about said core.

6. The device according to claim 4 further including a capacitor coupled across the coil of said third element.

7. The device according to claim 1 wherein said second branch element comprises a pair of sub-elements, each sub-element extending between said nodes, and wherein said input coil includes a plurality of windings extending about each of said sub-elements, said windings being connected so that the mmf induced on said sub-elements by said current is in opposite directions.

8. The device according to claim 7 further comprises a plurality of additional branch elements extending between said nodes, and a corresponding plurality of additional input coils, wherein said additional branch elements each include a pair of sub-elements and are configured with said additional input coils in a manner similar to the respective sub-elements and windings of said first coil about said sub-elements.

9. The device according to claim 8 wherein the number of additional branch elements and additional input coils equals two, said device being a three phase current limiter.

10. The device according to claim 1 wherein said predetermined function defines different linear relationships, each of said relationships being operative for a predetermined time period.

11. A device for limiting current in an electric circuit comprising:
A. one or more input legs of magnetically saturable material, each input leg having an associated input coil wound around said input leg and coupled to said electric circuit,
B. a shunt leg in flux transfer relationship to said input legs, said shunt leg providing a flux shunting path for said input legs, and
C. flux bias means for biasing said input legs into saturation when no current passes through said input coils, said bias means including a means to sense level of said current and a means responsive to said sensed level to bias said input legs with an mmf which is related to said level, wherein each of said input coils is adapted to drive its associated input leg out of saturation in response to current from said electric circuit when that current exceeds a predetermined threshold, said associated input leg being saturated when current passing through said input coil is below said threshold.

12. A device for limiting positive or negative current transients in any electric circuit branch comprising:
an input circuit means and an associated direct current limiter, said input circuit means including:
a first terminal pair and associated means coupled to said electric circuit branch to provide a signal representative of the magnitude of current therethrough, and
a second terminal pair and associated means responsive to said signal to provide a unidirectional current in a predetermined direction through a load coupled across said second terminal pair, wherein the magnitude of said unidirectional current is proportional to the magnitude of the current through said electric circuit branch, and said direct current limiter including:
at least three magnetic circuit branch elements extending between two nodes:
i. the first of said branch elements being characterized by a permeance $P_1$,
ii. the second of said branch elements being characterized by a non-linear permeance $P_2$ and having saturated and non-saturated states, wherein $P_2$ is greater when said second element is in said non-saturated state than when in said saturated state, and wherein the magnetic flux density of said second element is equal to a saturation flux density which is relatively invariant with respect to magneto-motive force applied across said second element when in said saturated state, and said magnetic flux density is less than said saturated flux density otherwise,
iii. the third of said branch elements is characterized by a permeance $P_3$ and includes a magneto-motive force (mmf) bias means for establishing a bias in said third element, and
said input circuit load, said load including an input coil having a plurality of windings about said second element so that mmf is induced on said second element in a predetermined direction between said nodes in response to said unidirectional current passing therethrough, wherein said elements are magnetically coupled at said nodes, and $P_1$ is relatively high with respect to the medium external to said device, $P_2$ is greater than $P_1$ and is relatively high with respect to the medium external to said device when said second element is non-saturated, and $P_3$ is relatively low with respect to $P_1$ and $P_2$ when said second element is non-saturated, and wherein further the net magnetic flux density in said second element is equal to the saturation flux density when said unidirectional current is below a predetermined threshold, and said net flux density is below said saturation flux density when said unidirectional current is in a predetermined range above and extending from said threshold.

13. The device according to claim 12 further comprising a means for sensing the level of current in said electric circuit branch and for generating a control signal representative thereof, and wherein said mmf bias means is responsive to said control signal to establish said bias mmf in said third element, the magnitude of said established mmf being a predetermined function of the level of said alternating current.

14. The device according to claim 13 wherein said predetermined function defines a linear relationship.

15. The device according to claim 13 wherein said third element comprises a coil driven by a current source, said current source being responsive to said control signal.

16. The device according to claim 15 wherein the coil of said third element is wound around a relatively high permeance core.

17. The device according to claim 16 further including a shorting bar disposed circuitously about said core.

18. The device according to claim 16 further including a capacitor coupled across the coil of said third element.

19. The device according to claim 13 wherein said predetermined function defines different linear relationships, each of said relationships being operative for a predetermined time period.

20. The device according to claim 12 wherein said input circuit means is a diode bridge circuit.

* * * * *